US012331590B1

(12) United States Patent
Sun

(10) Patent No.: US 12,331,590 B1
(45) Date of Patent: Jun. 17, 2025

(54) CURTAIN ROLLER

(71) Applicant: Jiani Zhong, Guangdong (CN)

(72) Inventor: Jianghai Sun, Guangdong (CN)

(73) Assignee: Jiani Zhong, Guangdong (CN)

( * ) Notice: Subject to any disclaimer, the term of this patent is extended or adjusted under 35 U.S.C. 154(b) by 0 days.

(21) Appl. No.: 18/787,614

(22) Filed: Jul. 29, 2024

(30) Foreign Application Priority Data

Jul. 19, 2024 (CN) ......................... 202421733930.3

(51) Int. Cl.
*E06B 9/42* (2006.01)
*E06B 9/64* (2006.01)
*E06B 9/80* (2006.01)

(52) U.S. Cl.
CPC .................. *E06B 9/80* (2013.01); *E06B 9/42* (2013.01); *E06B 9/64* (2013.01)

(58) Field of Classification Search
CPC ..... E06B 9/80; E06B 9/42; E06B 9/64; E06B 9/50; E06B 9/40; E06B 9/56; A47H 1/022
See application file for complete search history.

(56) References Cited

U.S. PATENT DOCUMENTS 322,713 A * 7/1885 Hartshorn ................ E06B 9/50 144/218
1,058,310 A * 4/1913 Lewis ....................... E06B 9/64 160/263
1,853,150 A * 4/1932 Schultes .................. E06B 9/60 188/82.9
5,036,898 A * 8/1991 Chen ...................... B60J 1/2033 160/370.21
5,054,533 A * 10/1991 Lii ......................... B60J 1/2063 160/370.21
5,226,467 A * 7/1993 Lii ........................... E06B 9/50 160/370.21
6,182,539 B1 * 2/2001 Webster .............. B25B 23/0021 81/177.2
2008/0121354 A1 * 5/2008 Cheng .................. E01F 13/028 160/290.1
2012/0024809 A1 * 2/2012 Rowan .................. A47H 13/00 211/124
2016/0245018 A1 * 8/2016 Pohjonen ................. E06B 9/60
2020/0355028 A1 * 11/2020 Lai ........................... E06B 9/50

* cited by examiner

*Primary Examiner* — Daniel P Cahn
*Assistant Examiner* — Jeremy C Ramsey

(57) ABSTRACT

A curtain roller includes a main body of roller and a stop part. The main body of roller is connected with a curtain, and the main body of roller is capable of rotating on a surface of the curtain to a winding position or an unfolding position. When the main body of roller rotates to the winding position, the main body of roller rolls up the curtain. When the main body of roller rotates to the unfolding position, the main body of roller unfolds the curtain. The stop part is connected to the main body of roller. A stop space is formed between the stop part and the main body of roller. When the main body of roller rotates to the winding position to roll up the curtain, and the curtain is positioned in the stop space, the main body of roller cannot rotate on the surface of the curtain.

15 Claims, 11 Drawing Sheets

CURTAIN ROLLER

CROSS-REFERENCE TO RELATED APPLICATIONS

The application claims priority of Chinese patent application CN2024217339303, filed on Jul. 19, 2024, which is incorporated herein by reference in its entireties.

TECHNICAL FIELD

The present disclosure relates to the field of curtains, particularly to a curtain roller.

BACKGROUND ART

A curtain, as a light blocking household item, is widely used. However, the existing curtains on the market usually expose or cover windows by sliding left and right, causing direct light to enter the room through an uncovered part of the window. The direct light can make a user feel dazzling and greatly affect the user experience. Therefore, there is an urgent need on the market to provide a curtain roller that can roll up the curtain from bottom to top, allowing the window to transmit light while blocking direct light, so as to improve the user experience.

SUMMARY

In order to overcome the shortcomings of the prior art, a curtain roller is provided in the present disclosure, including a main body of roller and a stop part.

The main body of roller is configured for connecting with a curtain, and the main body of roller is capable of rotating on a surface of the curtain to a winding position or an unfolding position. When the main body of roller rotates to the winding position, the main body of roller rolls up the curtain. When the main body of roller rotates to the unfolding position, the main body of roller unfolds the curtain.

The stop part is connected to the main body of roller, and a stop space is formed between the stop part and the main body of roller. When the main body of roller rotates to the winding position to roll up the curtain, and the curtain is positioned in the stop space, the main body of roller cannot rotate on the surface of the curtain, so that the main body of roller is stopped at the winding position.

As an improvement of the present disclosure, the stop part is detachably connected to the main body of roller.

As an improvement of the present disclosure, the stop part is magnetically connected to the main body of roller.

As an improvement of the present disclosure, the stop part is equipped with a first magnetic attraction member, the main body of roller is equipped with a first magnetic attraction fitting member, and the first magnetic attraction member is magnetically connected to the first magnetic attraction fitting member.

As an improvement of the present disclosure, the main body of roller is equipped with a first stop tooth portion, and the stop part is equipped with a second stop tooth portion. When the stop part is connected to the main body of roller, the first stop tooth portion meshes with the second stop tooth portion to prevent relative rotation between the main body of roller and the stop part.

As an improvement of the present disclosure, an end portion of the main body of roller is provided with a first mounting hole. The stop part is provided with a connecting end wall, a first mounting shaft, and a first stop shaft. The first mounting shaft and the first stop shaft extend from the connecting end wall, and the first mounting shaft and the first stop shaft are spaced apart from each other. The first mounting shaft is inserted into the first mounting hole, and the stop space is formed between the first stop shaft and the main body of roller.

As an improvement of the present disclosure, the main body of roller is equipped with the first stop tooth portion, and the stop part is equipped with the second stop tooth portion. When the stop part is connected to the main body of roller, the first stop tooth portion meshes with the second stop tooth portion to prevent relative rotation between the main body of roller and the stop part. The first stop tooth portion is positioned inside the first mounting hole, and the second stop tooth portion is positioned on the first mounting shaft.

As an improvement of the present disclosure, the stop part is provided with the first magnetic attraction member, the main body of roller is provided with the first magnetic attraction fitting member, and the first magnetic attraction member is magnetically connected to the first magnetic attraction fitting member. The first magnetic attraction fitting member is positioned inside the first mounting hole, and the first magnetic attraction member is positioned on the first mounting shaft.

As an improvement of the present disclosure, the main body of roller is provided with a first end and a second end opposite to the first end. A total number of the stop parts is two, and the two stop parts are respectively connected to the first end and the second end.

As an improvement of the present disclosure, the main body of roller includes a first connecting rod and a second connecting rod. One end of the first connecting rod is provided with a first connecting portion, the first connecting portion is provided with a second mounting hole, the second connecting rod is inserted into the first connecting rod through the second mounting hole, and the second connecting rod is slidable and telescopic within the first connecting rod.

As an improvement of the present disclosure, the main body of roller also includes a third connecting rod, an opposite end of the first connecting rod is equipped with a second connecting portion, the second connecting portion is provided with a third mounting hole, the third connecting rod is inserted into the first connecting rod through the third mounting hole, and the third connecting rod is slidable and telescopic within the first connecting rod.

As an improvement of the present disclosure, the curtain roller further includes a first locking member. When the second connecting rod is inserted into the first connecting rod through the second mounting hole, the first locking member is detachably connected to the first connecting portion, and the first locking member locks the second connecting rod into the second mounting hole.

As an improvement of the present disclosure, the first locking member is a first locking sleeve ring, and an inner wall of the first locking sleeve ring is pressed against an outer wall of the first connecting portion, so that an inner wall of the second mounting hole tightly presses the second connecting rod within the second mounting hole.

As an improvement of the present disclosure, the curtain roller further includes a second locking member. When the third connecting rod is inserted into the first connecting rod through the third mounting hole, the second locking member is detachably connected to the second connecting portion, and the second locking member locks the third connecting rod in the third mounting hole. The second locking member is a second locking sleeve ring, and an inner wall of the second locking sleeve ring is pressed against an outer wall of the second connecting portion, so that an inner wall of the third mounting hole tightly presses the third connecting rod within the third mounting hole.

As an improvement of the present disclosure, the first connecting portion is narrow in front and wide in back, and the second connecting portion is narrow in front and wide in back.

As an improvement of the present disclosure, the first connecting portion is equipped with a first slit, a second slit, and a first elastic wall positioned between the first slit and the second slit. The second connecting portion is equipped with a third slit, a fourth slit, and a second elastic wall positioned between the third slit and the fourth slit.

As an improvement of the present disclosure, the first connecting rod includes a first connecting unit and a second connecting unit. The first connecting unit is detachably connected to the second connecting unit.

As an improvement of the present disclosure, the first connecting unit is detachably connected to the second connecting unit through threads.

As an improvement of the present disclosure, the outer wall of the first connecting portion is provided with a first external thread, an inner wall of the first locking sleeve ring is provided with a first internal thread, and the first external thread is detachably connected to the first internal thread.

As an improvement of the present disclosure, the outer wall of the second connecting portion is equipped with a second external thread, the inner wall of the second locking sleeve ring is equipped with a second internal thread, and the second external thread is detachably connected to the second internal thread.

As an improvement of the present disclosure, the first mounting shaft is equipped with a fourth mounting hole, and the first magnetic attraction member is positioned inside the fourth mounting hole.

As an improvement of the present disclosure, when the main body of roller rotates on an inner surface of the curtain to the winding position to roll up the curtain, and the curtain is positioned in the stop space, the stop part is pressed against an outer surface of the curtain, so that the main body of roller cannot rotate on the inner surface of the curtain to the unfolded position, so that the main body of roller is stopped at the winding position.

A curtain roller is further provided in the present disclosure, including a main body of roller and a stop part.

The main body of roller is configured for connecting with a curtain, and the main body of roller is configured for rotating to a winding position to roll up the curtain.

The stop part is connected to the main body of roller, and a stop space is formed between the stop part and the main body of roller. When the curtain is positioned in the stop space, the main body of roller is not rotatable, so that the main body of roller is stopped at the winding position.

The beneficial effects of the present disclosure are as follows. The curtain roller is provided in the present disclosure, including the main body of roller and the stop part. The main body of roller is configured for connecting with the curtain, and the main body of roller is capable of rotating on the surface of the curtain to the winding position or the unfolding position. When the main body of roller rotates to the winding position, the main body of roller rolls up the curtain. When the main body of roller rotates to the unfolding position, the main body of roller unfolds the curtain. The stop part is connected to the main body of roller, and the stop space is formed between the stop part and the main body of roller, when the main body of roller rotates to the winding position to roll up the curtain, and the curtain is positioned in the stop space, the main body of roller cannot rotate on the surface of the curtain, so that the main body of roller is stopped at the winding position. Therefore, a user can use the main body of roller to rotate on the surface of the curtain to the winding position to roll up the curtain. After the curtain is rolled up, the curtain can be placed in the stop space formed between the stop part and the main body of roller, so that the main body of roller cannot rotate on the surface of the curtain, and the main body of roller is stopped and fixed in the winding position, preventing the curtain from slipping and unfolding. Moreover, when the user needs to unfold the curtain, the curtain can be detached from the stop space, so that the main body of roller can rotate on the surface of the curtain to the unfolding position to unfold the curtain. Specifically, the main body of roller is connected to a bottom portion of the curtain, so that the main body of roller can roll up the curtain from bottom to top. The position where the curtain is rolled up can be adjusted according to the angle of sunlight, so that the window can transmit light while blocking direct light, avoiding direct light and improving the user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
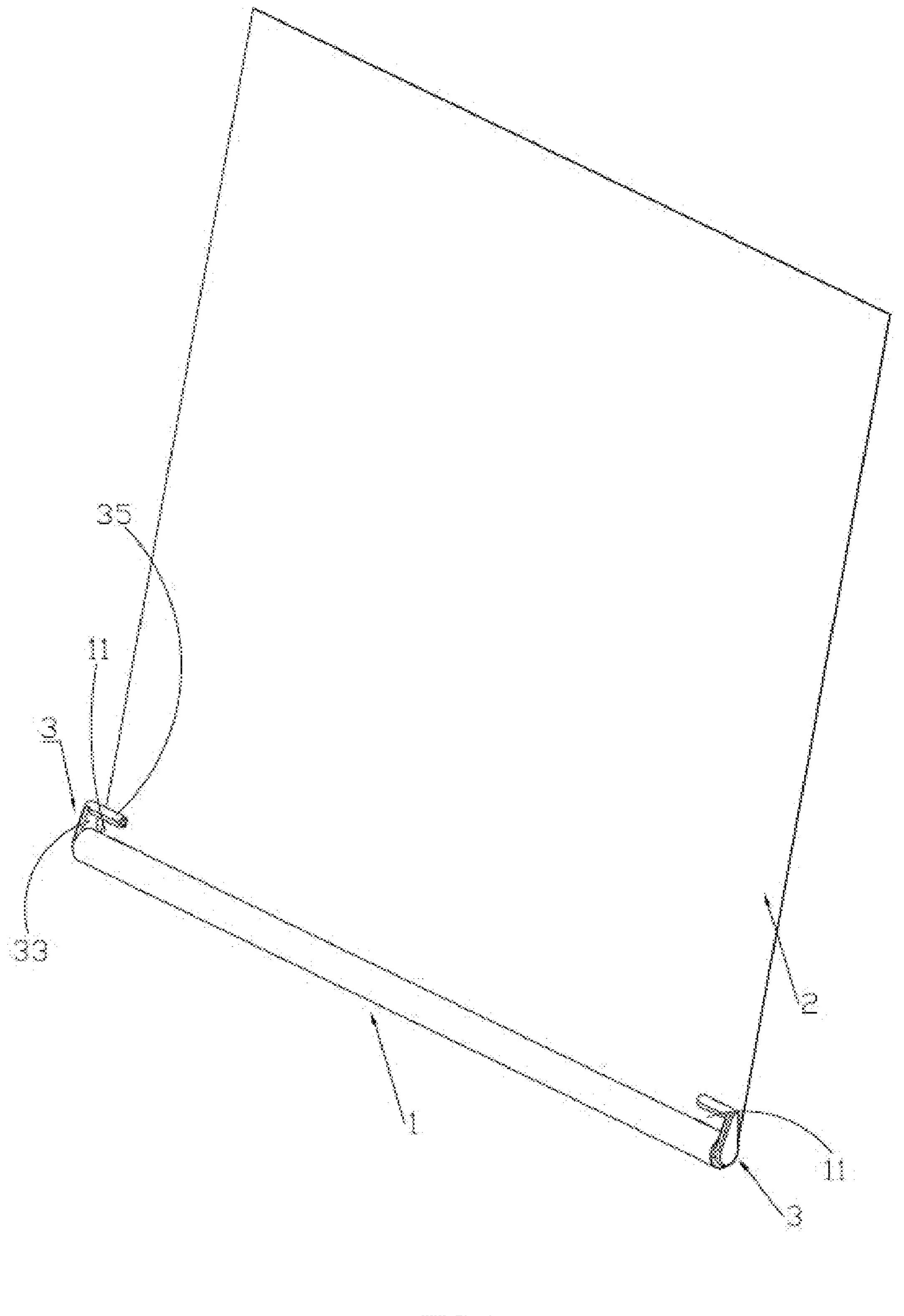
FIG. 1 is a schematic diagram of an overall structure of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
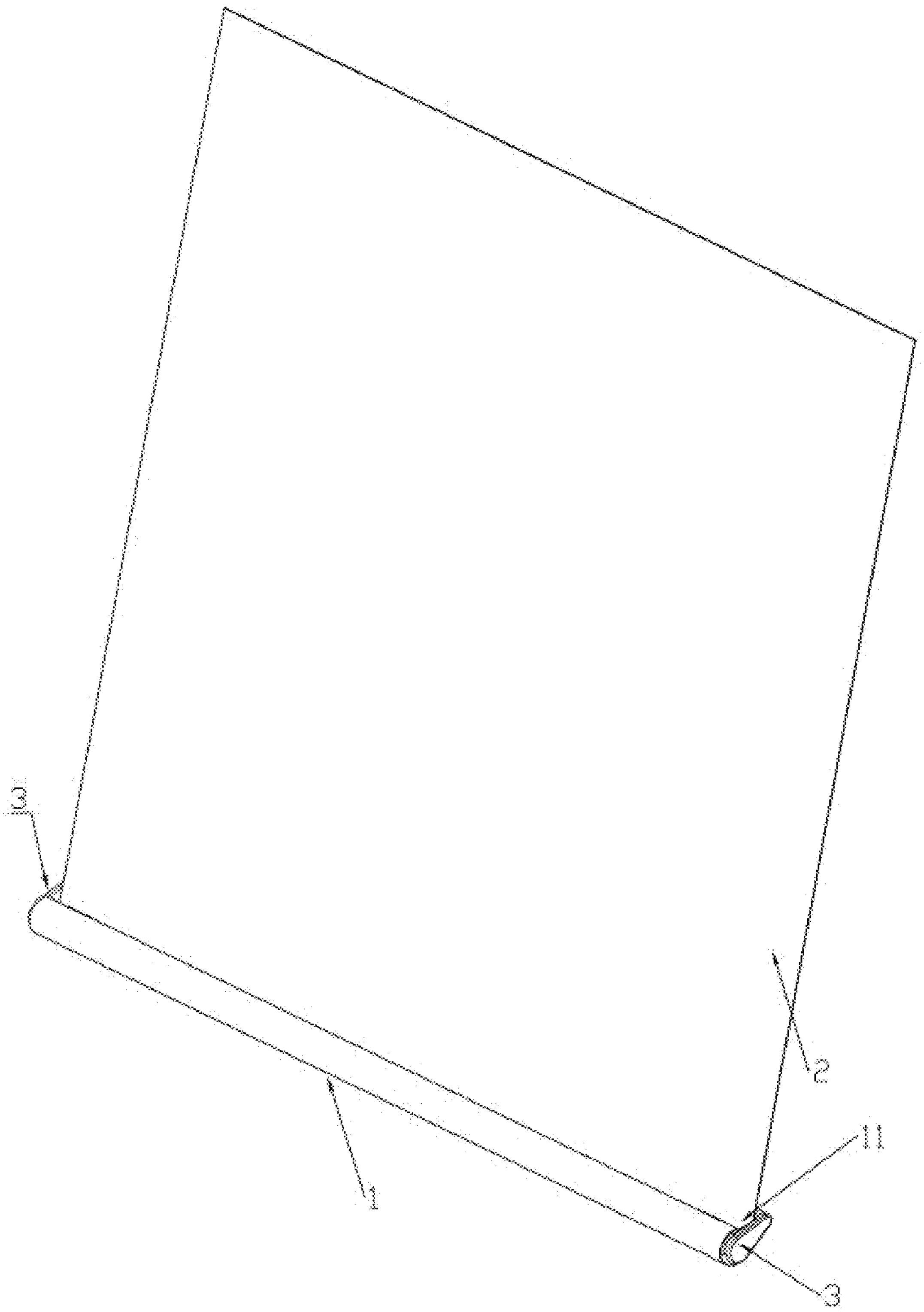
FIG. 2 is a schematic diagram of an overall structure when a curtain is positioned in a stop space.
Figure 3:
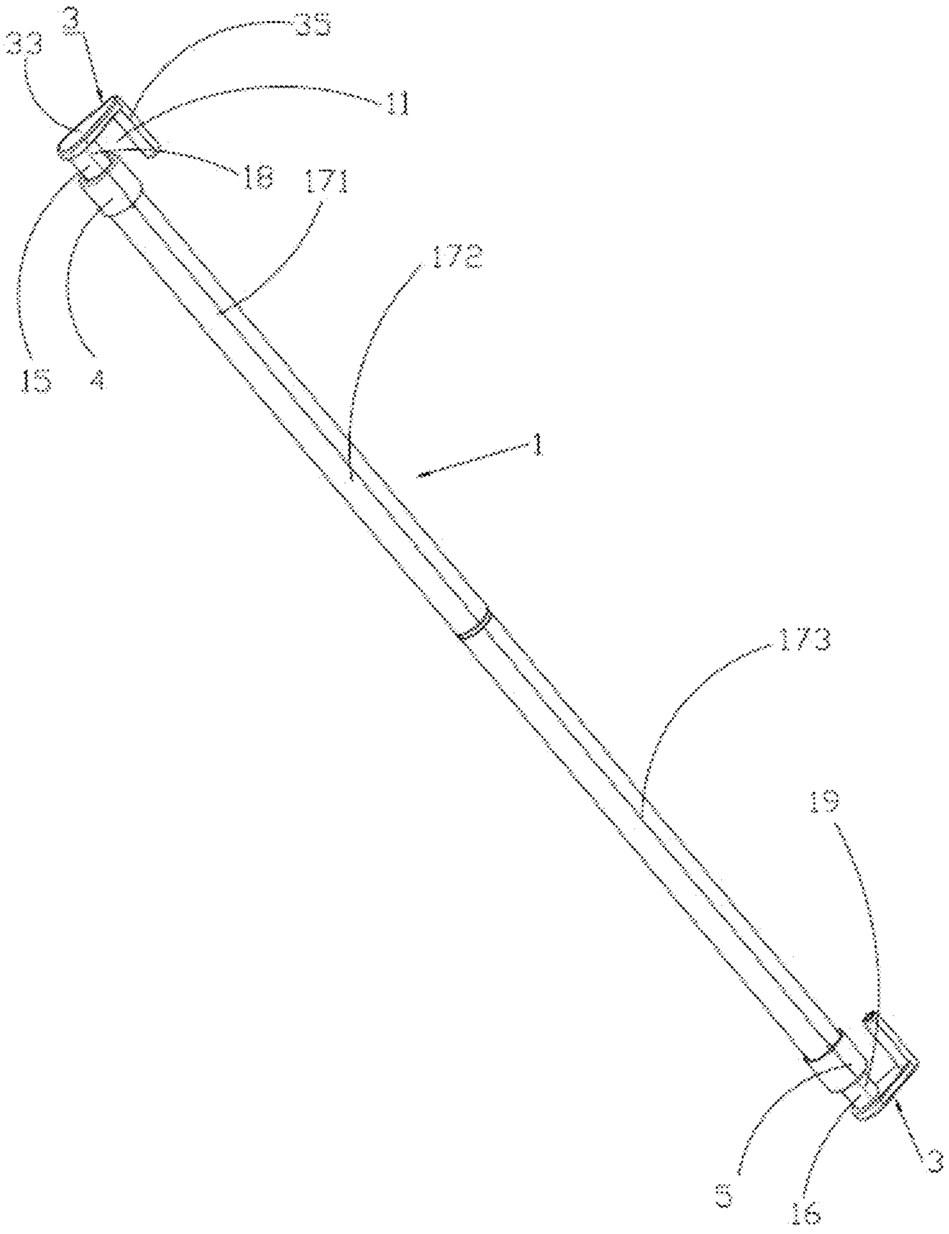
FIG. 3 is a structural schematic diagram of a main body of roller.
Figure 4:
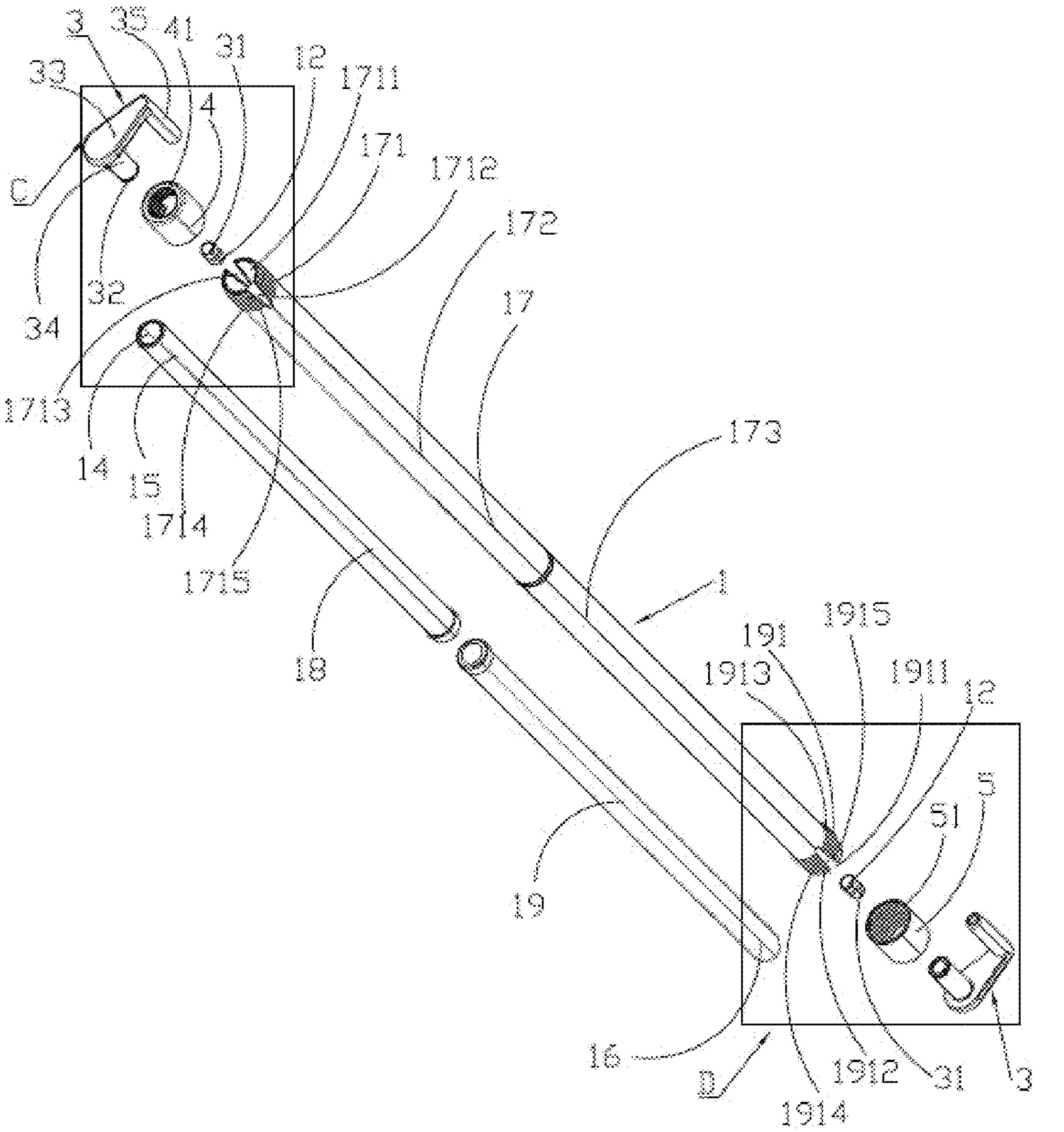
FIG. 4 is an exploded view of the present disclosure.
Figure 5:
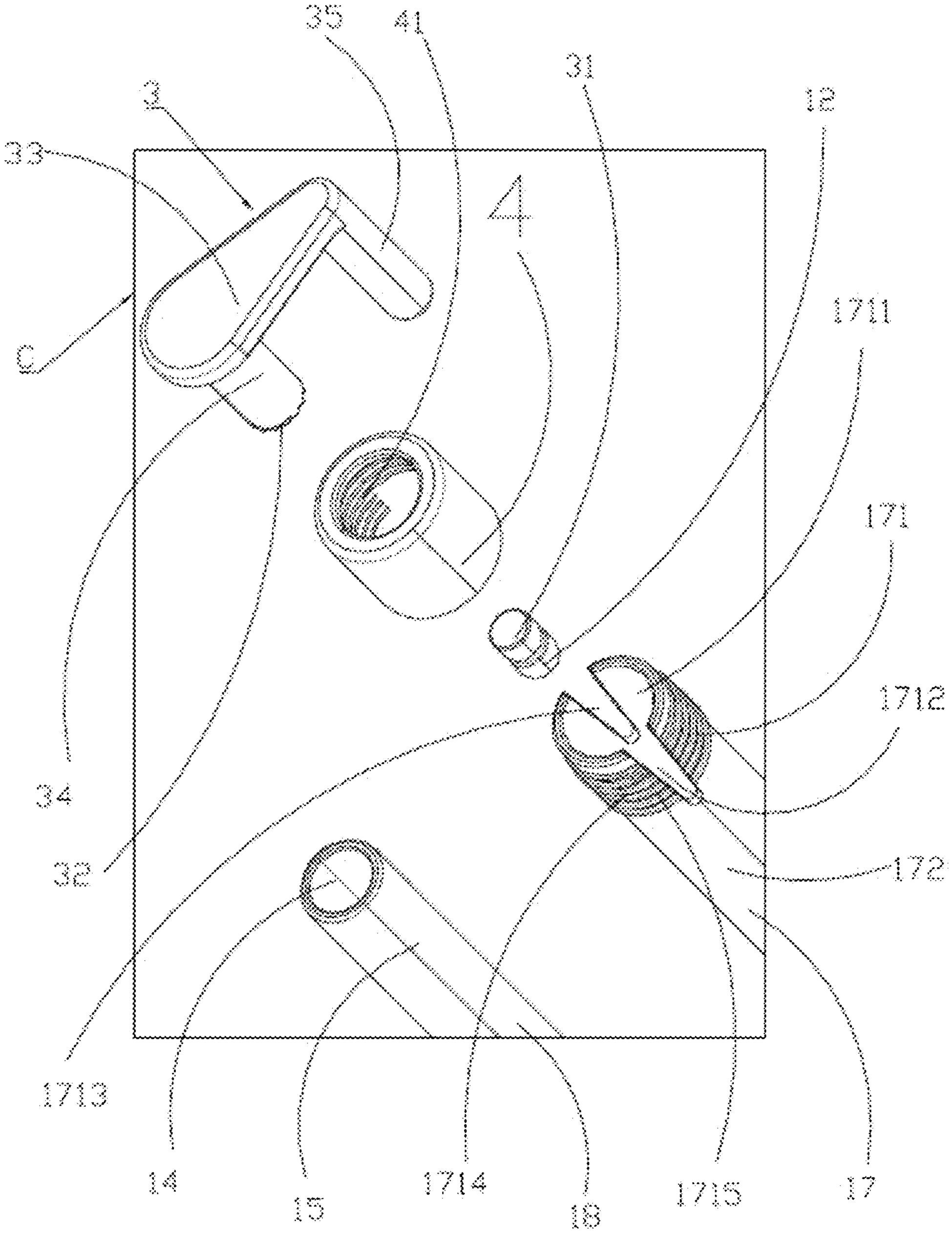
FIG. 5 is an enlarged view of area C in FIG. 4.
Figure 6:
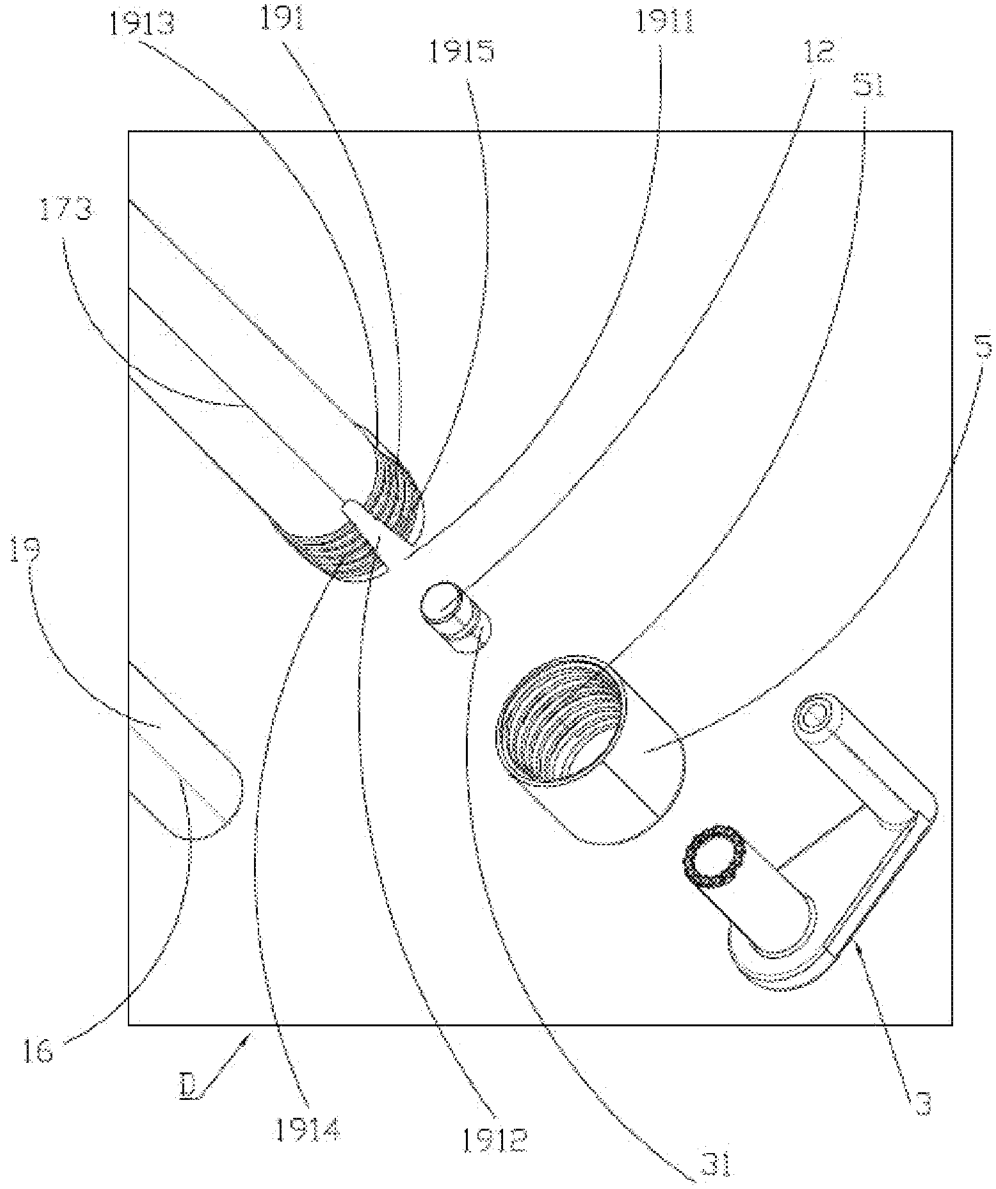
FIG. 6 is an enlarged view of area D in FIG. 4.
Figure 7:
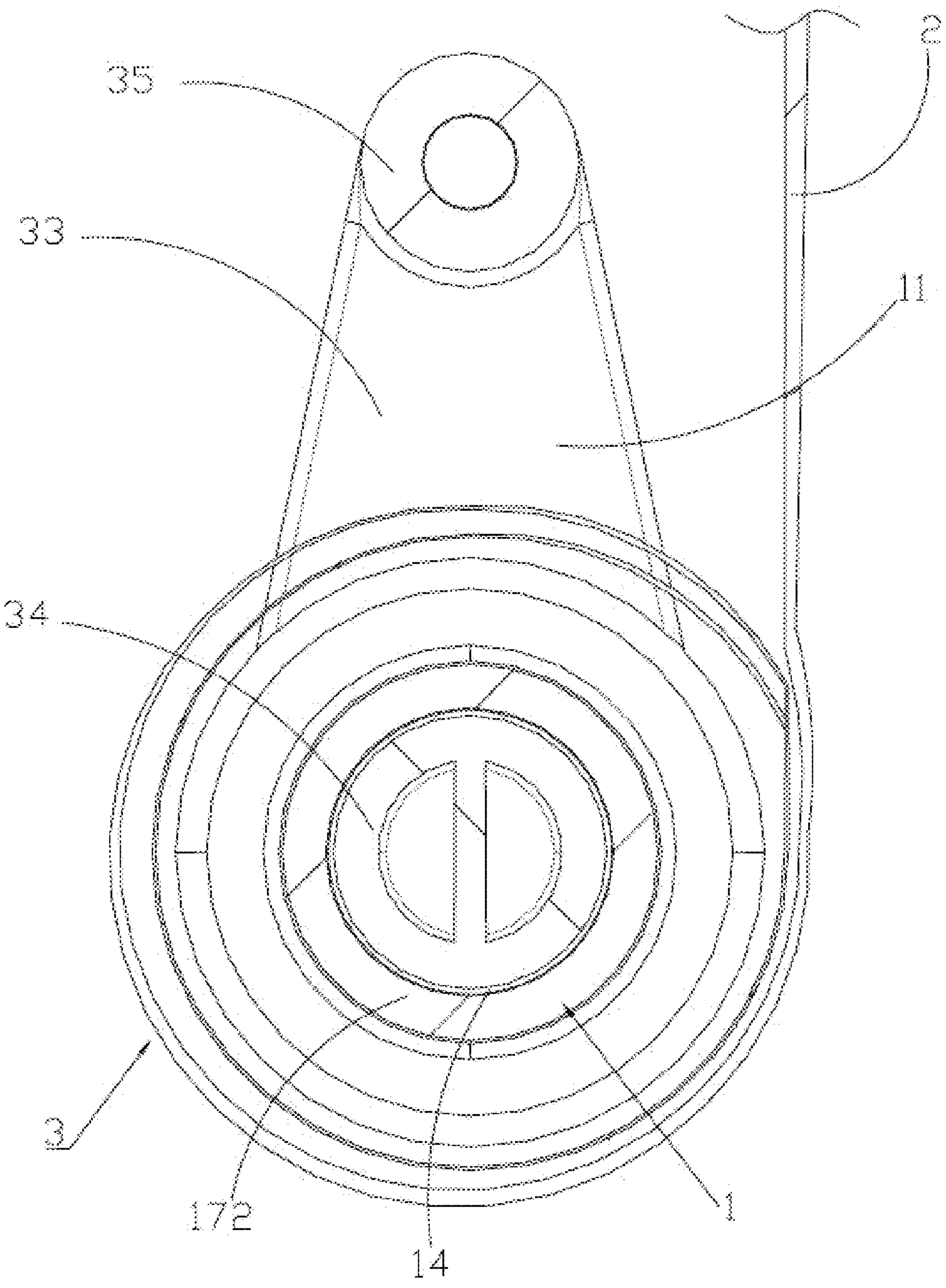
FIG. 7 is a sectional view along a main body of roller, a stop part, and a curtain when the curtain is not positioned in a stop space.
Figure 8:
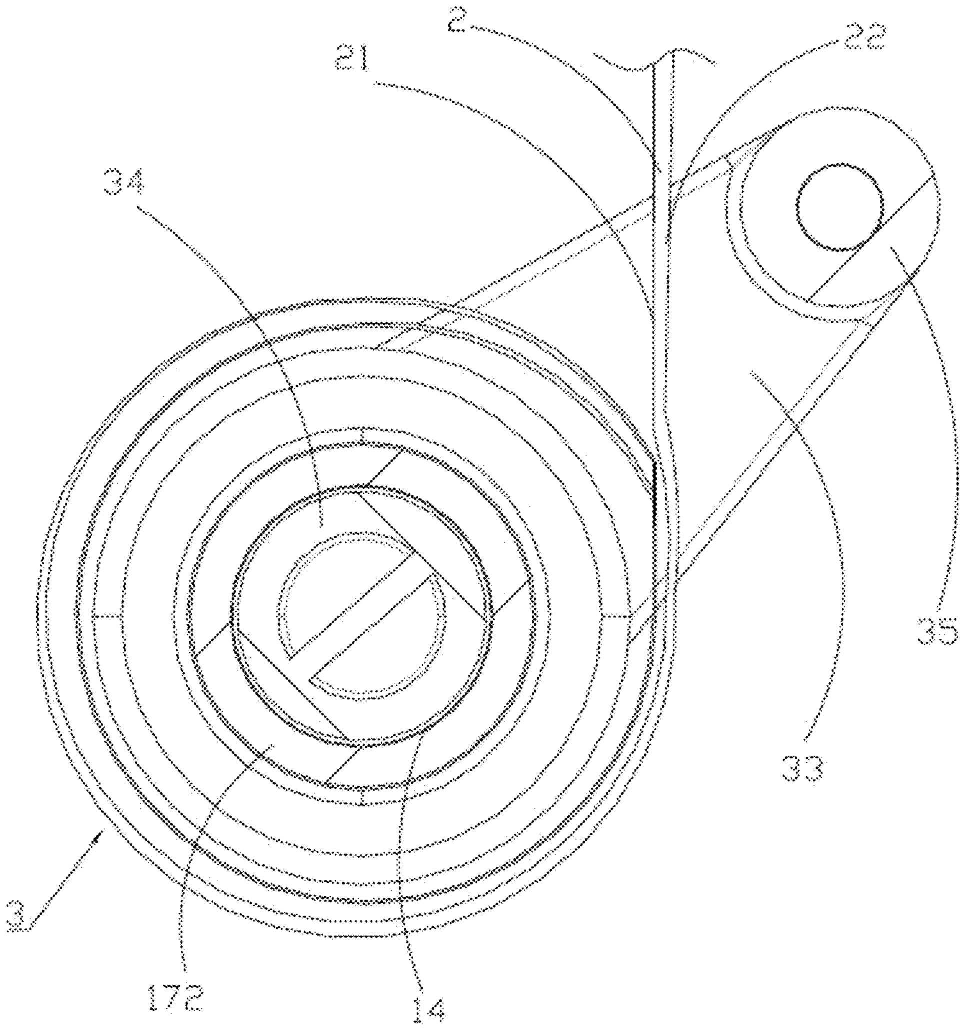
FIG. 8 is a sectional view along a main body of roller, a stop part, and a curtain when the curtain is positioned in a stop space.
Figure 9:
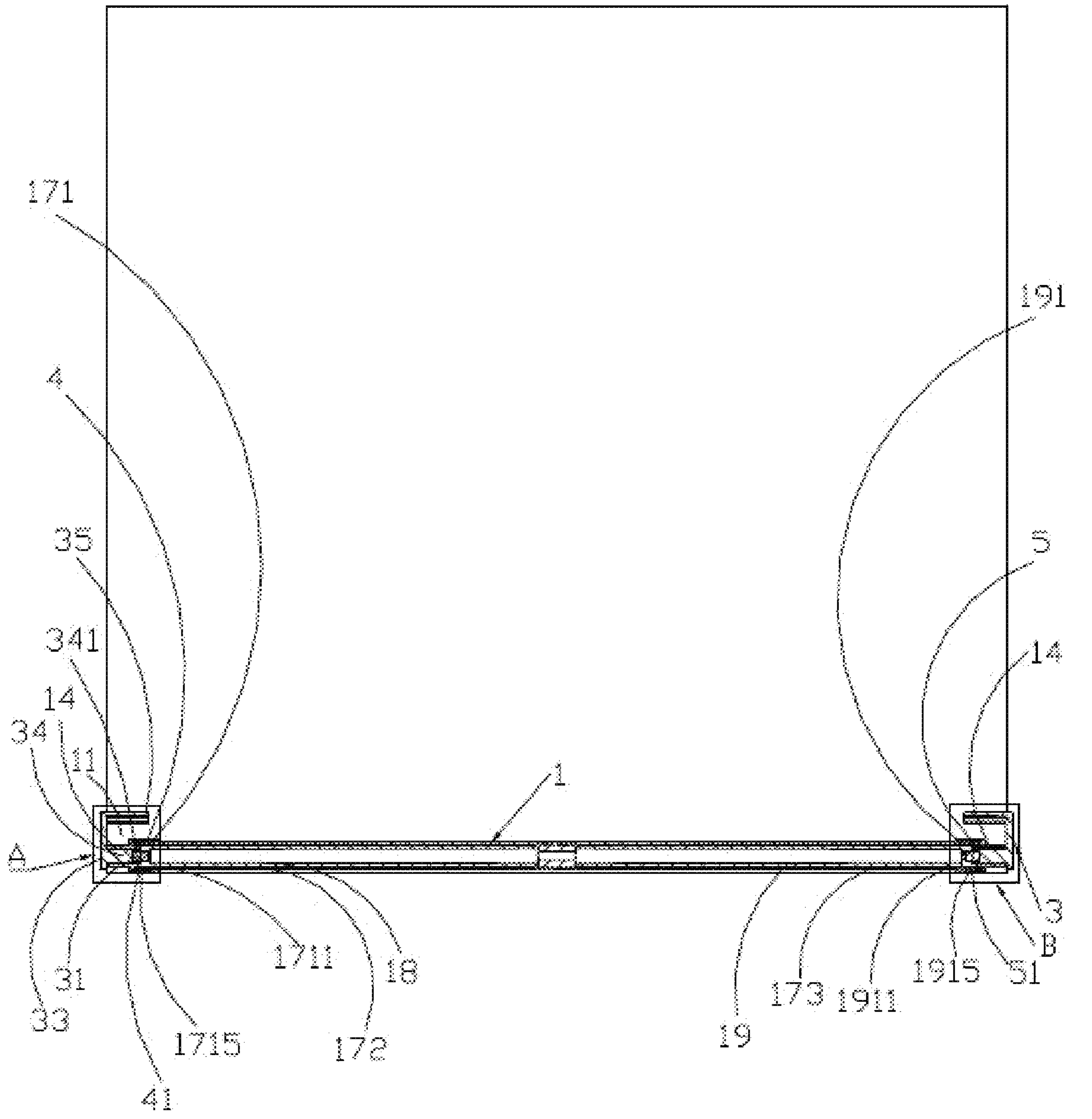
FIG. 9 is a sectional view cut along a first connecting rod, a second connecting rod, a third connecting rod, a stop part, a first locking member, and a second locking member.
Figure 10:
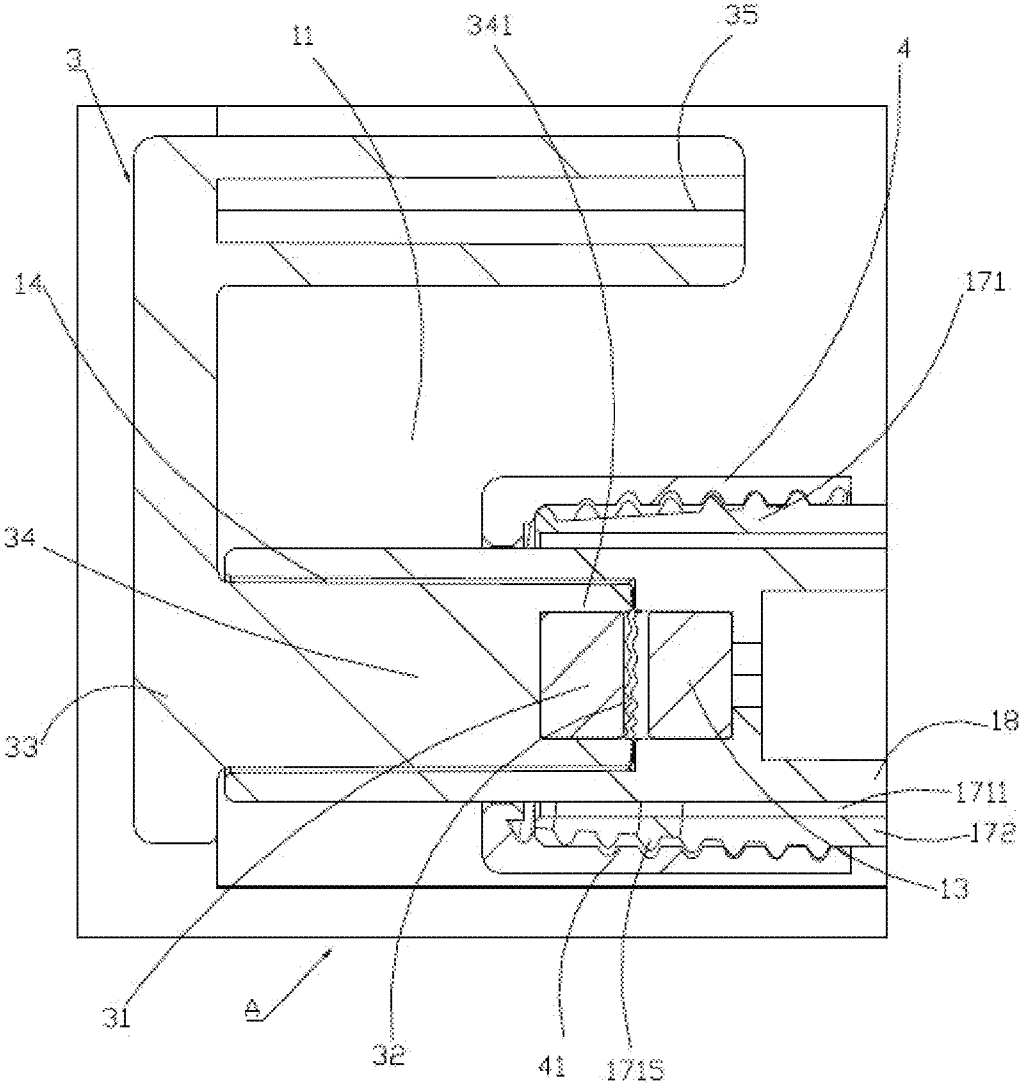
FIG. 10 is an enlarged view of area A in FIG. 9.
Figure 11:
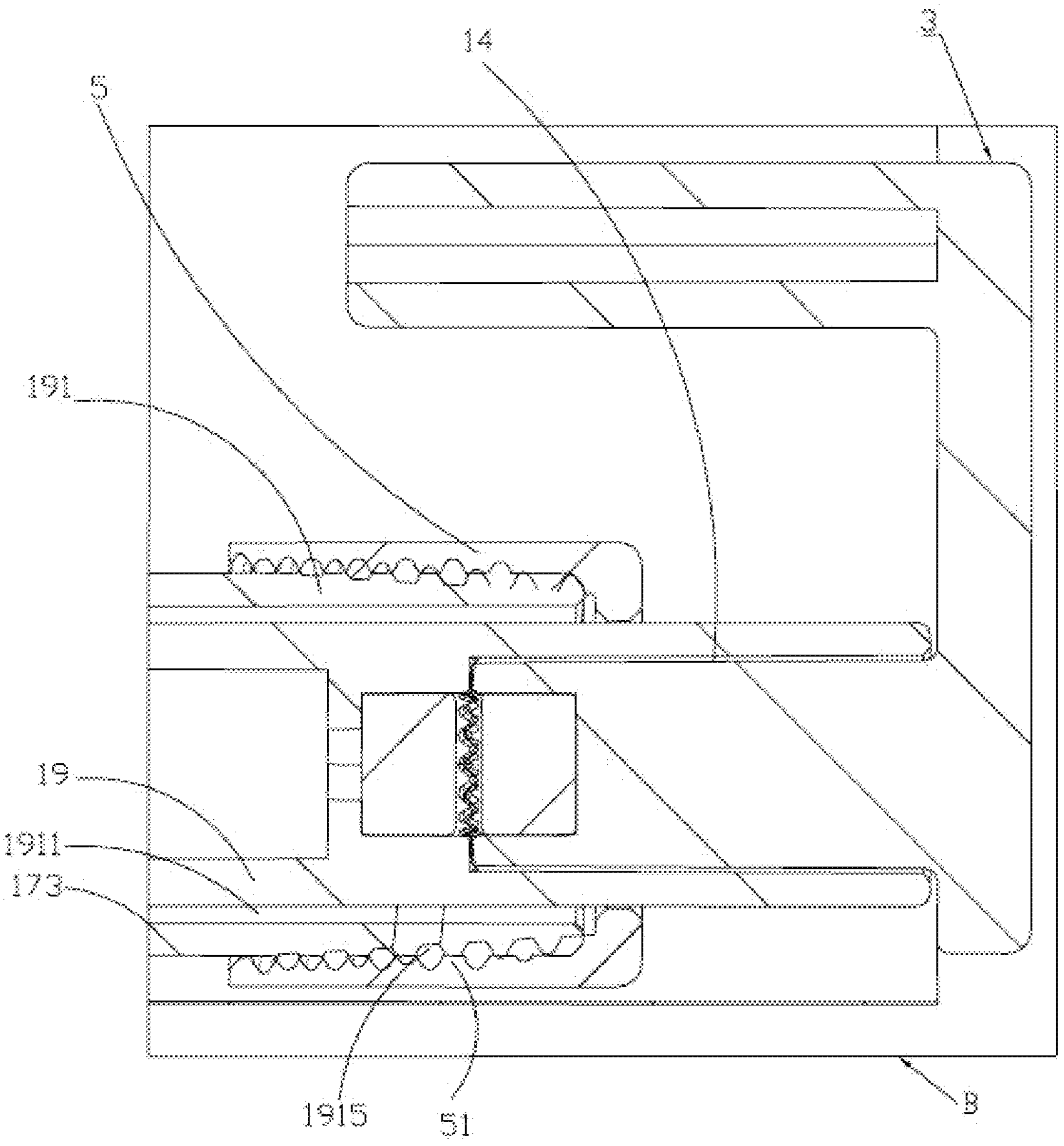
FIG. 11 is an enlarged view of area B in FIG. 9.

Referring to FIG. 1 to FIG. 11, a curtain roller includes a main body 1 of roller and a stop part 3.

The main body 1 of roller is configured for connecting with a curtain 2, and the main body 1 of roller is capable of rotating on a surface of the curtain 2 to a winding position or an unfolding position. When the main body 1 of roller rotates to the winding position, the main body 1 of roller rolls up the curtain 2. When the main body 1 of roller rotates to the unfolding position, the main body 1 of roller unfolds the curtain 2.

The stop part 3 is connected to the main body 1 of roller, and a stop space 11 is formed between the stop part 3 and the main body 1 of roller. When the main body 1 of roller rotates to the winding position to roll up the curtain 2, and the curtain 2 is positioned in the stop space 11, the main body 1 of roller cannot rotate on the surface of the curtain 2, so that the main body 1 of roller is stopped at the winding position.

Through the above structure, the curtain roller includes the main body 1 of roller and the stop part 3. The main body 1 of roller is configured for connecting with the curtain 2, and the main body 1 of roller is capable of rotating on the surface of the curtain 2 to the winding position or the unfolding position. When the main body 1 of roller rotates to the winding position, the main body 1 of roller rolls up the curtain 2. When the main body 1 of roller rotates to the unfolding position, the main body 1 of roller unfolds the curtain 2. The stop part 3 is connected to the main body 1 of roller, and the stop space 11 is formed between the stop part 3 and the main body 1 of roller, when the main body 1 of roller rotates to the winding position to roll up the curtain 2, and the curtain 2 is positioned in the stop space 11, the main body 1 of roller cannot rotate on the surface of the curtain 2, so that the main body 1 of roller is stopped at the winding position. Therefore, a user can use the main body 1 of roller to rotate on the surface of the curtain 2 to the winding position to roll up the curtain 2. After the curtain 2 is rolled up, the curtain 2 can be placed in the stop space 11 formed between the stop part 3 and the main body 1 of roller, so that the main body 1 of roller cannot rotate on the surface of the curtain 2, and the main body 1 of roller is stopped and fixed in the winding position, preventing the curtain 2 from slipping and unfolding. Moreover, when the user needs to unfold the curtain 2, the curtain 2 can be detached from the stop space 11, so that the main body 1 of roller can rotate on the surface of the curtain 2 to the unfolding position to unfold the curtain 2. Specifically, the main body 1 of roller is connected to a bottom portion of the curtain, so that the main body 1 of roller can roll up the curtain from bottom to top. The position where the curtain is rolled up can be adjusted according to the angle of sunlight, so that the window can transmit light while blocking direct light, avoiding direct light and improving the user experience.

When the main body 1 of roller rotates on an inner surface 21 of the curtain 2 to the winding position to roll up the curtain 2, and the curtain 2 is positioned in the stopping space 11, the stop part 3 is pressed against an outer surface 22 of the curtain 2, so that the main body 1 of roller cannot rotate on the inner surface 21 of the curtain 2 to the unfolding position, so that the main body 1 of roller is stopped at the winding position.

In this embodiment, the stop part 3 is detachably connected to the main body 1 of roller. The stop part 3 is magnetically connected to the main body 1 of roller. Specifically, the stop part 3 is equipped with a first magnetic attraction member 31, the main body 1 of roller is equipped with a first magnetic attraction fitting member 12, and the first magnetic attraction member 31 is magnetically connected to the first magnetic attraction fitting member 12. Through the above structure, when the user needs to rotate the main body 1 of roller along the surface of the curtain 2 to the winding position or the unfolding position, the stop part 3 can be detached from the main body 1 of roller to facilitate the rotation of the main body 1 of roller along the surface of the curtain 2 to the winding position or the unfolding position. When the user rotates the main body 1 of roller to the winding position to roll up a part of the curtain 2, the stop part 3 can be connected to the main body 1 of roller to place the curtain 2 in the stop space 11 formed between the main body 1 of roller and the stop part 3, so that the main body 1 of roller cannot rotate on the surface of the curtain 2, and the main body 1 of roller can be stopped and fixed in the winding position to prevent the curtain 2 from sliding and unfolding. Moreover, due to the magnetic connection between the stop part 3 and the main body 1 of roller, it is convenient for the user to install and remove the stop part 3.

In this embodiment, the main body 1 of roller is equipped with a first stop tooth portion 13, and the stop part 3 is equipped with a second stop tooth portion 32. When the stop part 3 is connected to the main body 1 of roller, the first stop tooth portion 13 meshes with the second stop tooth portion 32 to prevent relative rotation between the main body 1 of roller and the stop part 3. Through the above structure, the position between the stop part 3 and the main body 1 of roller can be fixed, so that the main body 1 of roller and the stop part 3 cannot rotate relative to each other, so as to stop the curtain 2 in the stop space 11 and prevent the main body 1 of roller from sliding along the surface of the curtain 2 to the unfolding position.

In this embodiment, an end portion of the main body 1 of roller is provided with a first mounting hole 14. The stop part 3 is provided with a connecting end wall 33, a first mounting shaft 34, and a first stop shaft 35. The first mounting shaft 34 and the first stop shaft 35 extend from the connecting end wall 33, and the first mounting shaft 34 and the first stop shaft 35 are spaced apart from each other. The first mounting shaft 34 is inserted into the first mounting hole 14, and the stop space 11 is formed between the first stop shaft 35 and the main body 1 of roller. The main body 1 of roller is equipped with the first stop tooth portion 13, and the stop part 3 is equipped with the second stop tooth portion 32. When the stop part 3 is connected to the main body 1 of roller, the first stop tooth portion 13 meshes with the second stop tooth portion 32 to prevent relative rotation between the main body 1 of roller and the stop part 3. The first stop tooth portion 13 is positioned inside the first mounting hole 14, and the second stop tooth portion 32 is positioned on the first mounting shaft 34. Specifically, the stop part 3 is provided with the first magnetic attraction member 31, the main body 1 of roller is provided with the first magnetic attraction fitting member 12, and the first magnetic attraction member 31 is magnetically connected to the first magnetic attraction fitting member 12. The first magnetic attraction fitting member 12 is positioned inside the first mounting hole 14, and the first magnetic attraction member 31 is positioned on the first mounting shaft 34. The first mounting shaft 34 is equipped with a fourth mounting hole 341, and the first magnetic attraction member 31 is positioned inside the fourth mounting hole 341. Through the above structure, the design is reasonable, and the setting of the stop part 3 is effectively achieved, which facilitates the installation and disassembly of the stop part 3 by the user, and facilitates the fixation of the main body 1 of roller in the winding position.

In this embodiment, the main body 1 of roller is provided with a first end 15 and a second end 16 opposite to the first end 15. A total number of the stop parts 3 is two, and the two stop parts 3 are respectively connected to the first end 15 and the second end 16. Through the above structure, the two stop parts 3 can stop and fix both ends of the main body 1 of roller, so that the main body 1 of roller can be fixed in the winding position to roll up the curtain 2, and the main body 1 of roller can be effectively prevented from rotating to the unfolding position to unfold the curtain 2.

In this embodiment, the main body 1 of roller further includes a first connecting rod 17 and a second connecting rod 18. One end of the first connecting rod 17 is provided with a first connecting portion 171, the first connecting portion 171 is provided with a second mounting hole 1711, the second connecting rod 18 is inserted into the first connecting rod 17 through the second mounting hole 1711, and the second connecting rod 18 is slidable and telescopic within the first connecting rod 17. The main body 1 of roller also includes a third connecting rod 19, an opposite end of the first connecting rod 17 is equipped with a second connecting portion 191, the second connecting portion 191 is provided with a third mounting hole 1911, the third connecting rod 19 is inserted into the first connecting rod 17 through the third mounting hole 1911, and the third connecting rod 19 is slidable and telescopic within the first connecting rod 17. Specifically, the first end 15 is positioned on the second connecting rod, and the second end 16 is positioned on the third connecting rod 19. Furthermore, the curtain roller also includes a first locking member 4. When the second connecting rod 18 is inserted into the first connecting rod 17 through the second mounting hole 1711, the first locking member 4 is detachably connected to the first connecting portion 171, and the first locking member 4 locks the second connecting rod 18 into the second mounting hole 1711. Furthermore, the first locking member 4 is a first locking sleeve ring, and an inner wall of the first locking sleeve ring is pressed against an outer wall of the first connecting portion 171, so that an inner wall of the second mounting hole 1711 tightly presses the second connecting rod within the second mounting hole 1711. Furthermore, the curtain roller also includes a second locking member 5. When the third connecting rod 19 is inserted into the first connecting rod through the third mounting hole 1911, the second locking member 5 is detachably connected to the second connecting portion 191, and the second locking member 5 locks the third connecting rod 19 in the third mounting hole 1911. Furthermore, the second locking member 5 is a second locking sleeve ring, and an inner wall of the second locking sleeve ring is pressed against an outer wall of the second connecting portion 191, so that an inner wall of the third mounting hole 1911 tightly presses the third connecting rod within the third mounting hole 1911. Through the above structure, due to the second connecting rod 18 and the third connecting rod 19 being telescopic within the first connecting rod, a length of the main body 1 of roller can be adjusted, so that the main body 1 of roller can adapt to more sizes of curtains 2. Moreover, after the length of the main body 1 of roller is adjusted, the length of the main body 1 of roller can be fixed by the first locking member 4 and the second locking member 5.

In this embodiment, the first connecting portion 171 is narrow in front and wide in back, and the second connecting portion 191 is narrow in front and wide in back. The first connecting portion 171 is equipped with a first slit 1712, a second slit 1713, and a first elastic wall 1714 positioned between the first slit 1712 and the second slit 1713. The second connecting portion 191 is equipped with a third slit 1912, a fourth slit 1913, and a second elastic wall 1914 positioned between the third slit 1912 and the fourth slit 1913. Specifically, a first connecting unit 172 is detachably connected to a second connecting unit 173 through threads. Furthermore, the outer wall of the first connecting portion 171 is provided with a first external thread 1715, an inner wall of the first locking sleeve ring is provided with a first internal thread 41, and the first external thread 1715 is detachably connected to the first internal thread 41. Through the above structure, when the first locking sleeve ring is connected to the first connecting portion 171, and the second locking sleeve ring is connected to the second connecting portion 191, the inner wall of the first locking sleeve ring is pressed against an outer wall of the first elastic wall 1714, so that an inner wall of the first elastic wall 1714 tightly presses the second connecting rod 18 within the second mounting hole 1711, and the inner wall of the second locking sleeve ring is pressed against an outer wall of the second elastic wall 1914, so that an inner wall of the second elastic wall 1914 tightly presses the third connecting rod 19 within the third mounting hole 1911. Moreover, since the first connecting portion 171 is narrow in front and wide in back, when the first internal thread 41 of the first locking sleeve ring rotates and locks along the first external thread 1715 of the first connecting portion 171, a degree to which the first elastic wall 1714 is squeezed increases gradually, making the connection between the first locking sleeve ring and the first connecting portion 171 become increasingly tight. Since the second connecting portion 191 is narrow in front and wide in back, when a second internal thread 51 of the second locking sleeve ring rotates and locks along a second external thread 1915 of the second connecting portion 191, a degree to which the second elastic wall 1914 is squeezed increases gradually, making the connection between the second locking sleeve ring and the second connecting portion 191 become increasingly tight.

In this embodiment, the first connecting rod 17 includes the first connecting unit 172 and the second connecting unit 173. The first connecting unit 172 is detachably connected to the second connecting unit 173. The outer wall of the second connecting portion 191 is equipped with the second external thread 1915, the inner wall of the second locking sleeve ring is equipped with the second internal thread 51, and the second external thread 1915 is detachably connected to the second internal thread 51. Through the above structure, due to the detachable connection between the first connecting unit 172 and the second connecting unit 173, it is convenient for the storage and transportation of the main body 1 of roller.

Referring to FIG. 1 to FIG. 5, a curtain roller includes a main body 1 of roller and a stop part 3.

The main body 1 of roller is configured for connecting with a curtain 2, and the main body 1 of roller is configured for rotating to a winding position to roll up the curtain 2.

The stop part 3 is connected to the main body 1 of roller, and a stop space 11 is formed between the stop part 3 and the main body 1 of roller. When the curtain 2 is positioned in the stop space 11, the main body 1 of roller is not rotatable, so that main body 1 of roller is stopped at the winding position.

Through the above structure, the curtain roller includes the main body 1 of roller and the stop part 3. The main body 1 of roller is configured for connecting with the curtain 2, and the main body 1 of roller is capable of rotating on a surface of the curtain 2 to the winding position or an unfolding position. When the main body 1 of roller rotates to the winding position, the main body 1 of roller rolls up the curtain 2. When the main body 1 of roller rotates to the unfolding position, the main body 1 of roller unfolds the curtain 2. The stop part 3 is connected to the main body 1 of roller, and the stop space 11 is formed between the stop part 3 and the main body 1 of roller. When the main body 1 of roller rotates to the winding position to roll up the curtain 2, and the curtain 2 is positioned in the stop space 11, the main body 1 of roller cannot rotate on the surface of the curtain 2, so that the main body 1 of roller is stopped at the winding position. Therefore, a user can use the main body 1 of roller to rotate on the surface of the curtain 2 to the winding position to roll up the curtain 2. After the curtain 2 is rolled up, the curtain 2 can be placed in the stop space 11 formed between the stop part 3 and the main body 1 of roller, so that the main body 1 of roller cannot rotate on the surface of the curtain 2, and the main body 1 of roller is stopped and fixed in the winding position, preventing the curtain 2 from slipping and unfolding. Moreover, when the user needs to unfold the curtain 2, the curtain 2 can be detached from the stop space 11, so that the main body 1 of roller can rotate on the surface of the curtain 2 to the unfolding position to unfold the curtain 2. Moreover, when the main body 1 of roller rolls up the curtain from bottom to top, the position where the curtain is rolled up can be adjusted according to the angle of sunlight, so that the window can transmit light while blocking direct light, avoiding direct light and improving the user experience.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A curtain roller, comprising:

a main body of the curtain roller, wherein the main body of the curtain roller is configured for connecting with a curtain, and the main body of the curtain roller is capable of rotating the curtain to a winding position or an unfolding position; when the main body of the curtain roller rotates to the winding position, the main body of the curtain roller rolls up the curtain; when the main body of the curtain roller rotates to the unfolding position, the main body of the curtain roller unfolds the curtain; and a stop part, wherein the stop part is connected to the main body of the curtain roller, and a stop space is formed between the stop part and the main body of the curtain roller; after the main body of the curtain roller rotates to the winding position to roll up the curtain, and the curtain is positioned in the stop space, the main body of the curtain roller cannot rotate on the surface of the curtain, so that the main body of the curtain roller is stopped at the winding position;

wherein the main body of the curtain roller comprises a first connecting rod and a second connecting rod, one end of the first connecting rod is provided with a first connecting portion, the first connecting portion is provided with a first mounting hole, the second connecting rod is inserted into the first connecting rod through the first mounting hole, and the second connecting rod is slidable and telescopic within the first connecting rod;

wherein the main body of the curtain roller also comprises a third connecting rod, an opposite end of the first connecting rod is equipped with a second connecting portion, the second connecting portion is provided with a second mounting hole, the third connecting rod is inserted into the first connecting rod through the second mounting hole, and the third connecting rod is slidable and telescopic within the first connecting rod;

wherein the first connecting portion is equipped with a first slit, a second slit, and a first elastic wall positioned between the first slit and the second slit; the second connecting portion is equipped with a third slit, a fourth slit, and a second elastic wall positioned between the third slit and the fourth slit.

2. The curtain roller according to claim 1, wherein the stop part is detachably connected to the main body of the curtain roller.

3. The curtain roller according to claim 2, wherein the stop part is magnetically connected to the main body of the curtain roller.

4. The curtain roller according to claim 3, wherein the stop part is equipped with a first magnetic attraction member, the main body of the curtain roller is equipped with a first magnetic attraction fitting member, and the first magnetic attraction member is magnetically connected to the first magnetic attraction fitting member.

5. The curtain roller according to claim 1, wherein the main body of the curtain roller is equipped with a first stop tooth portion, the stop part is equipped with a second stop tooth portion, and when the stop part is connected to the main body of the curtain roller, the first stop tooth portion meshes with the second stop tooth portion to prevent relative rotation between the main body of the curtain roller and the stop part.

6. The curtain roller according to claim 1, wherein an end portion of the main body of the curtain roller is provided with a third mounting hole; the stop part is provided with a connecting end wall, a first mounting shaft, and a first stop shaft; the first mounting shaft and the first stop shaft extend from the connecting end wall, the first mounting shaft and the first stop shaft are spaced apart from each other, the third mounting shaft is inserted into the third mounting hole, and the stop space is formed between the first stop shaft and the main body of the curtain roller.

7. The curtain roller according to claim 6, wherein the main body of the curtain roller is equipped with a first stop tooth portion, the stop part is equipped with the second stop tooth portion, and when the stop part is connected to the main body of the curtain roller, the first stop tooth portion meshes with the second stop tooth portion to prevent relative rotation between the main body of the curtain roller and the stop part; the first stop tooth portion is positioned inside the third mounting hole, and the second stop tooth portion is positioned on the first mounting shaft.

8. The curtain roller according to claim 6, wherein the stop part is provided with a first magnetic attraction member, the main body of the curtain roller is provided with a first magnetic attraction fitting member, and the first magnetic attraction member is magnetically connected to the first magnetic attraction fitting member; the first magnetic attraction fitting member is positioned inside the third mounting hole, and the first magnetic attraction member is positioned on the first mounting shaft.

9. The curtain roller according to claim 1, wherein the main body of the curtain roller is provided with a first end and a second end opposite to the first end, a total number of the stop parts is two, and the two stop parts are respectively connected to the first end and the second end.

10. The curtain roller according to claim 9, further comprising a first locking member, wherein when the second connecting rod is inserted into the first connecting rod through the first mounting hole, the first locking member is detachably connected to the first connecting portion, and the first locking member locks the second connecting rod into the second mounting hole.

11. The curtain roller according to claim 10, wherein the first locking member is a first locking sleeve ring, and an inner wall of the first locking sleeve ring is pressed against an outer wall of the first connecting portion, so that an inner wall of the first mounting hole tightly presses the second connecting rod within the first mounting hole.

12. The curtain roller according to claim 10, further comprising a second locking member, wherein when the third connecting rod is inserted into the first connecting rod through the second mounting hole, the second locking member is detachably connected to the second connecting portion, and the second locking member locks the third connecting rod in the second mounting hole; the second locking member is a second locking sleeve ring, and an inner wall of the second locking sleeve ring is pressed against an outer wall of the second connecting portion, so that an inner wall of the second mounting hole tightly presses the third connecting rod within the second mounting hole.

13. The curtain roller according to claim 9, wherein the first connecting portion tapers from a middle to an end of the first connecting rod, and the second connecting portion tapers from a middle to an end of the first connecting rod.

14. The curtain roller according to claim 9, wherein the first connecting rod comprises a first connecting unit and a second connecting unit, and the first connecting unit is detachably connected to the second connecting unit.

15. The curtain roller according to claim 11, wherein the outer wall of the first connecting portion is provided with a first external thread, an inner wall of the first locking sleeve ring is provided with a first internal thread, and the first external thread is detachably connected to the first internal thread.

* * * * *